(12) United States Patent
Lei et al.

(10) Patent No.: US 9,280,704 B2
(45) Date of Patent: Mar. 8, 2016

(54) COMMUNICATING WIRELESS PAIRING INFORMATION FOR PAIRING AN ELECTRONIC DEVICE TO A HOST SYSTEM

(71) Applicant: The Code Corporation, Bluffdale, UT (US)

(72) Inventors: Ming Lei, Princeton Junction, NJ (US); Mark Ashby, Taylorsville, UT (US); Jonathan Bosley, Saratoga Springs, UT (US); Steve Pierce, West Jordan, UT (US)

(73) Assignee: The Code Corporation, Buffdale, UT (US)

( * ) Notice: Subject to any disclaimer, the term of this patent is extended or adjusted under 35 U.S.C. 154(b) by 311 days.

(21) Appl. No.: 13/916,413

(22) Filed: Jun. 12, 2013

(65) Prior Publication Data
US 2014/0370807 A1    Dec. 18, 2014

(51) Int. Cl.
| | |
|---|---|
| H04W 76/02 | (2009.01) |
| G06K 9/00 | (2006.01) |
| H04W 4/00 | (2009.01) |
| H04W 4/20 | (2009.01) |
| H04W 12/04 | (2009.01) |
| H04L 9/08 | (2006.01) |
| H04W 84/18 | (2009.01) |

(52) U.S. Cl.
CPC .......... *G06K 9/00496* (2013.01); *H04L 9/0844* (2013.01); *H04W 4/008* (2013.01); *H04W 4/206* (2013.01); *H04W 12/04* (2013.01); *H04L 2209/80* (2013.01); *H04W 84/18* (2013.01)

(58) Field of Classification Search
CPC ... H04W 76/02; H04W 1/7253; H04M 88/06; H04M 2250/02
USPC ................ 455/41.2, 3.06, 414.4, 410, 412.1, 455/412.2
See application file for complete search history.

(56) References Cited

U.S. PATENT DOCUMENTS

| | | | | |
|---|---|---|---|---|
| 7,632,187 | B1 * | 12/2009 | Farley et al. ..................... | 463/53 |
| 7,965,983 | B1 * | 6/2011 | Swan et al. .................. | 455/41.2 |
| 8,082,444 | B1 * | 12/2011 | Elliott .......................... | 713/171 |
| 2005/0226468 | A1 * | 10/2005 | Deshpande et al. .......... | 382/115 |
| 2007/0176909 | A1 * | 8/2007 | Pavlowski ..................... | 345/179 |
| 2009/0076804 | A1 * | 3/2009 | Bradford et al. ............. | 704/203 |
| 2009/0259612 | A1 * | 10/2009 | Hanson .......................... | 706/47 |
| 2010/0318656 | A1 * | 12/2010 | Ferren .......................... | 709/225 |
| 2011/0021147 | A1 * | 1/2011 | Tout .............................. | 455/41.2 |
| 2011/0063103 | A1 * | 3/2011 | Lee et al. ...................... | 340/505 |
| 2011/0099591 | A1 * | 4/2011 | Long et al. ..................... | 725/81 |
| 2011/0234829 | A1 * | 9/2011 | Gagvani et al. ............ | 348/222.1 |
| 2011/0281519 | A1 * | 11/2011 | Reuss et al. .................. | 455/41.2 |
| 2013/0013414 | A1 * | 1/2013 | Haff .......................... | 705/14.64 |
| 2013/0041831 | A1 * | 2/2013 | Das ................................ | 705/72 |
| 2014/0053281 | A1 * | 2/2014 | Benoit et al. .................... | 726/29 |
| 2014/0222462 | A1 * | 8/2014 | Shakil et al. ...................... | 705/3 |
| 2015/0082410 | A1 * | 3/2015 | Fitzgerald et al. ................ | 726/9 |
| 2015/0084745 | A1 * | 3/2015 | Hertz et al. ................. | 340/10.3 |

* cited by examiner

*Primary Examiner* — Minh D Dao
(74) *Attorney, Agent, or Firm* — Timothy P. O'Hagan; Austin Rapp & Hardman (57) ABSTRACT

During a pairing procedure between an electronic device and a host system, the host system may output audiovisual data that communicates wireless pairing information. The electronic device may detect the audiovisual data and determine the wireless pairing information by processing the audiovisual data that it detects. The wireless pairing information may facilitate pairing the electronic device to the host system in accordance with the short-range wireless communication protocol.

21 Claims, 10 Drawing Sheets

FIG. 6 (ctd.)

FIG. 7

FIG. 7 (ctd.)

FIG. 8

COMMUNICATING WIRELESS PAIRING INFORMATION FOR PAIRING AN ELECTRONIC DEVICE TO A HOST SYSTEM

TECHNICAL FIELD

The present disclosure relates generally to short-range wireless communication. More specifically, the present disclosure relates to communicating wireless pairing information that may be used for pairing an electronic device to a host system for short-range wireless communication.

BACKGROUND

Bluetooth® is a protocol for short-range wireless communication. Bluetooth® technology has been integrated into many types of business and consumer devices, including bar code scanners, cell phones, laptops, keyboards, mice, headsets, automobiles, medical devices, etc. This allows users to form ad hoc networks between a wide variety of devices to transfer voice and data.

Bluetooth® specifications define security mechanisms for protecting communications between Bluetooth® devices. In accordance with these security mechanisms, trust between two Bluetooth® devices is created via a pairing procedure. The purpose of the pairing procedure is to create a common shared secret, called a link key, between the two devices.

Currently available Bluetooth® specifications specify several different pairing procedures. For devices that operate in accordance with Bluetooth® v2.0 (or earlier), pairing between two Bluetooth® devices requires both Bluetooth® devices to enter a personal identification number (PIN), and pairing is successful only if both devices enter the same PIN.

Bluetooth® v2.1 (and later) allows the use of Secure Simple Pairing (SSP) for link key establishment. SSP provides a number of association models that are flexible in terms of device input/output capability. SSP also improves security through the addition of Elliptic Curve Diffie-Hellman (ECDH) public key cryptography for protection against passive eavesdropping and man-in-the-middle attacks during pairing.

SUMMARY

The present disclosure relates generally to pairing an electronic device to a host system in accordance with a short-range wireless communication protocol, such as Bluetooth®. During a pairing procedure between an electronic device and a host system, the host system may output audiovisual data that communicates wireless pairing information. The electronic device may detect the audiovisual data and determine the wireless pairing information by processing the audiovisual data that it detects.

For example, the host system may display an alphanumeric visual representation of the wireless pairing information. The electronic device may include a camera that captures a digital image of the display screen of the host system. The electronic device may also include an optical character recognition (OCR) module that performs OCR on the digital image to determine the wireless pairing information.

As another example, the host system may play an electronically generated dictation of the wireless pairing information via speakers of the host system. The electronic device may include an audio recorder that captures an audio recording of the electronically generated dictation. The electronic device may also include a speech recognition module that performs speech recognition on the audio recording to determine the wireless pairing information.

As another example, the host system may display a bar code that includes an encoded representation of the wireless pairing information. The electronic device may include a camera that captures a digital image of the bar code. The electronic device may also include a bar code decoder system that may determine the wireless pairing information by decoding the bar code.

The wireless pairing information may facilitate pairing the electronic device to the host system in accordance with the short-range wireless communication protocol. For example, if the electronic device and the host system operate in accordance with Bluetooth® v2.0 (or earlier), the wireless pairing information may include a PIN that the electronic device and the host system may both use to derive a link key. As another example, if the electronic device and the host system operate in accordance with Bluetooth® v2.1 (or later), the electronic device and the host system may both use the wireless pairing information to confirm that the pairing procedure is being performed with the correct device, as opposed to being performed with an unauthorized device (e.g., a man-in-the-middle attack).

DETAILED DESCRIPTION

Figure 1:
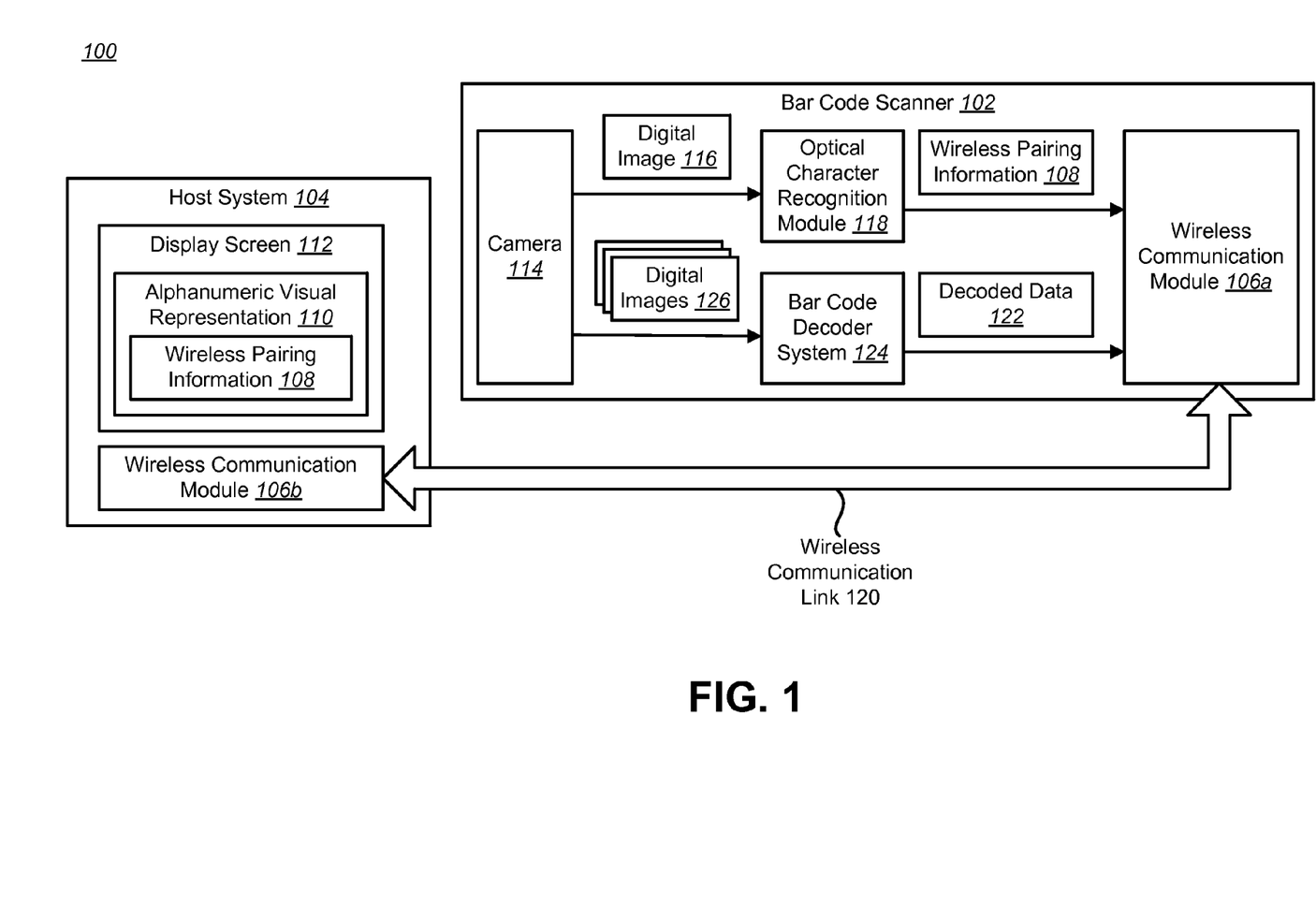
FIG. 1 illustrates a system in which an electronic device, such as a bar code scanner, may be paired to a host system.

FIG. 1 illustrates a system 100 in which an electronic device, such as a bar code scanner 102, may be paired to a host system 104. Although a bar code scanner 102 is shown in the system 100 of FIG. 1, the techniques described herein may also be utilized to pair other types of electronic devices to a host system 104. The host system 104 may be a personal computer, a smartphone, a laptop computer, a tablet computer, etc.

The bar code scanner 102 is a device for identifying or extracting information from bar codes. A bar code is an optical machine-readable representation of information. Bar codes may represent information by varying the widths and spacings of parallel lines. These types of bar codes may be referred to as linear or one-dimensional (1D) bar codes. Alternatively, bar codes may represent information via rectangles, dots, hexagons and other geometric patterns in two dimensions (2D). The bar code scanner 102 may be capable of scanning 1D and/or 2D bar codes. The bar code scanner 102 may be a camera-based scanner, a pen-type scanner, a laser scanner, an omni-directional scanner, etc.

Both the bar code scanner 102 and the host system 104 may implement a short-range wireless communication protocol, such as Bluetooth®. The bar code scanner 102 is shown with a wireless communication module 106a and the host system 104 is shown with a wireless communication module 106b for providing this functionality.

In accordance with the short-range wireless communication protocol, the bar code scanner 102 and the host system 104 may perform a pairing procedure. The pairing procedure may be initiated by the bar code scanner 102 and/or by the host system 104. For example, the bar code scanner 102 may make itself discoverable (enter discoverable mode) and indicate that it supports the Human Interface Device (HID) Profile. The host system 104 may, when in pairing mode, show a list of devices which are in discoverable mode. To initiate pairing by the host system 104 the user may select the bar code scanner 102 from the list of devices.

During this pairing procedure, the host system 104 may output audiovisual data that communicates wireless pairing information 108. As used herein, the term "audiovisual data" refers to data that communicates information visually and/or audibly. Examples of audiovisual data which communicates paring information visually may include a sequence of digits displayed as human discernible numerals such as Arabic numerals (e.g., 1234), a single 1D or 2D bar code representing a sequence of characters or numerals, a sequence of 1D or 2D bar codes, each representing a single character or numeral, or one or more 1D or 2D bar code(s) each representing multiple characters or numerals. If multiple bar codes are used for sequential reading to input the wireless pairing information 108, an additional bar code may represent completion of entry of the pairing information 108 (a finished code) indicative to the bar code scanner 102 that entry of the wireless pairing information 108 is complete.

The wireless pairing information 108 may facilitate pairing the bar code scanner 102 to the host system 104 in accordance with the short-range wireless communication protocol. For example, if the bar code scanner 102 and the host system 104 operate in accordance with Bluetooth® v2.0 (or earlier), the wireless pairing information 108 may include a PIN that should be entered into the bar code scanner 102 in order for pairing to continue. The host system 104 may output the audiovisual data in such a way that the wireless pairing information 108 is discernible by humans. For example, the host system 104 may display an alphanumeric visual representation 110 of the wireless pairing information 108 (e.g., "1234") on a display screen 112 of the host system 104.

If the bar code scanner 102 were capable of receiving alphanumeric user input, then a user could enter the wireless pairing information 108 into the bar code scanner 102. The bar code scanner 102 may present itself as a keyboard to the host system 104, so the host system 104 may interact with the bar code scanner 102 as though it is capable of receiving alphanumeric input. However, the bar code scanner 102 may lack a keypad or other user input device that would permit entry of alphanumeric input.

To facilitate pairing, the bar code scanner 102 may detect the audiovisual data that is output by the host system 104 during the pairing procedure. The bar code scanner 102 may include a data detector for providing this functionality. The data detector may be a camera 114. The camera 114 may capture a digital image 116 of the display screen 112 of the host system 104, which may include the alphanumeric visual representation 110 of the wireless pairing information 108.

The bar code scanner 102 may determine the wireless pairing information 108 by processing the audiovisual data that it detects. The bar code scanner 102 may include a recognition module for providing this functionality. The recognition module may be an optical character recognition (OCR) module 118. The OCR module 118 may perform OCR on the digital image 116 to determine the wireless pairing information 108. The recognition module may be a bar code decoder system 124 for decoding one or more 1D or 2D bar codes which represent the wireless pairing information 108.

The wireless communication modules 106a, 106b may use the wireless pairing information 108 to establish a wireless communication link 120 with each other. For example, if the bar code scanner 102 and the host system 104 operate in accordance with Bluetooth® v2.0 (or earlier) and the wireless pairing information 108 includes a PIN, the wireless communication modules 106a, 106b may both use the PIN to derive a link key. The bar code scanner 102 and the host system 104 may then complete pairing by mutually authenticating each other to verify that they have the same link key.

After the wireless communication link 120 has been established, the bar code scanner 102 may use the wireless communication link 120 to send information to and receive information from the host system 104. For example, the wireless communication module 106a may transfer decoded data 122 (i.e., data that is obtained by scanning and decoding bar codes) to the host system 104 via the wireless communication link 120. The bar code scanner 102 is shown with a bar code decoder system 124 for providing the functionality of decoding bar codes. If the bar code scanner 102 is a camera-based scanner, the same camera 114 that is used to capture a digital image 116 of the alphanumeric visual representation 110 of the wireless pairing information 108 may be used to capture digital images 126 of bar codes. The bar code decoder system 124 may attempt to decode the bar codes by processing these digital images 126.

Figure 2:
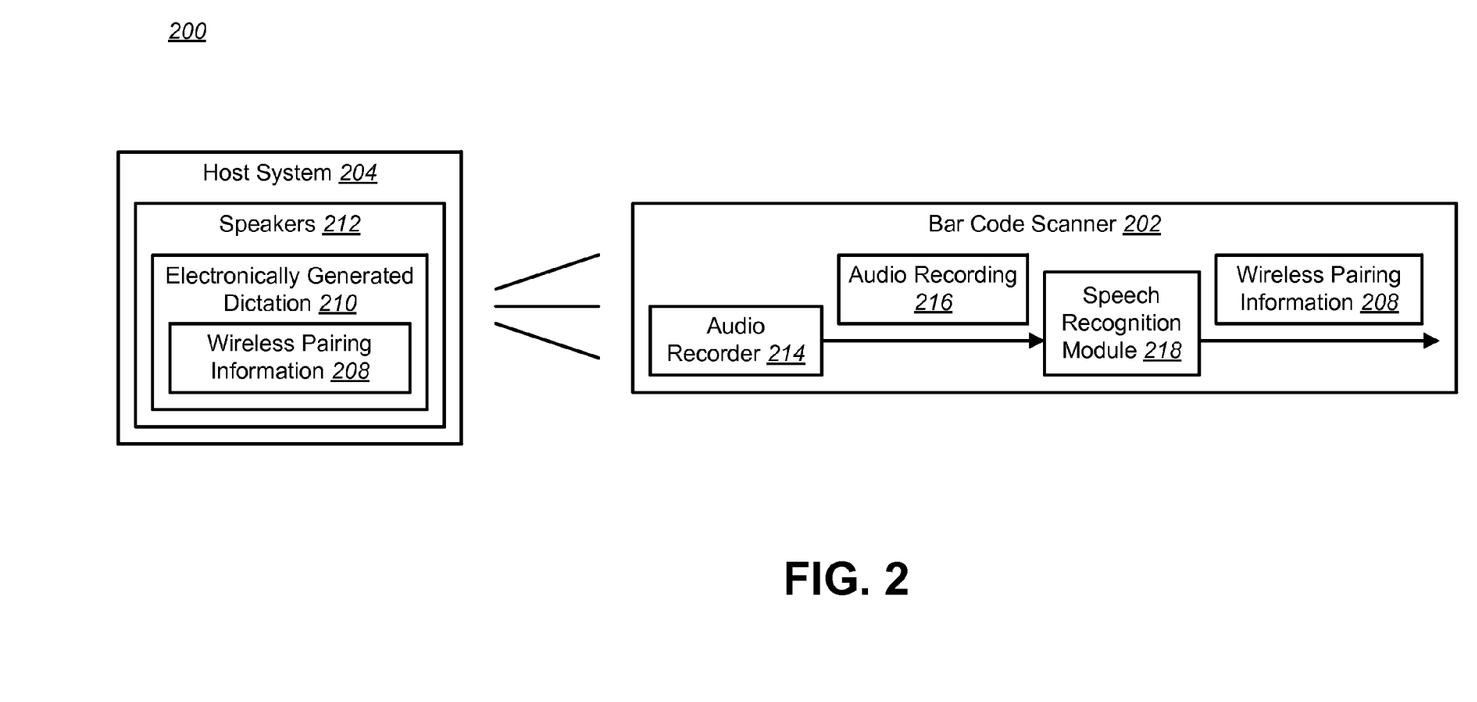
FIG. 2 illustrates another system in which a bar code scanner may be paired to a host system.

FIG. 2 illustrates another system 200 in which an electronic device, such as a bar code scanner 202, may be paired to a host system 204. The system 200 shown in FIG. 2 may be similar to the system 100 shown in FIG. 1, except as described below.

Like the bar code scanner 102 discussed previously, the bar code scanner 202 shown in FIG. 2 includes a data detector and a recognition module. However, in the bar code scanner 202 shown in FIG. 2, the data detector is an audio recorder 214, and the recognition module is a speech recognition module 218.

Like the host system 104 discussed previously, the host system 204 shown in FIG. 2 may output audiovisual data that communicates wireless pairing information 208. However, the host system 204 shown in FIG. 2 may output the audiovisual data by playing an electronically generated dictation 210 of the wireless pairing information 208 via speakers 212 of the host system 204. For example, if the wireless pairing information 208 is a PIN having a value of "1234," the host system 204 may play an electronically generated dictation 210 of the words "one, two, three four" via the speakers 212. Alternatively, the output of audiovisual data may be a visual prompt for an operator to speak digits displayed by the host system 204. For example, if the wireless pairing information 208 is a PIN having a value of "1234," the host system 204 may display the digits 1, 2, 3, 4 and prompt the use to speak the words "one, two, three, four".

The audio recorder 214 of the bar code scanner 202 may detect the audiovisual data by capturing an audio recording 216 of the electronically generated dictation 210 or the spoken words. The speech recognition module 218 of the bar code scanner 202 may perform speech recognition on the audio recording 216 to determine the wireless pairing information 208.

Figure 3:
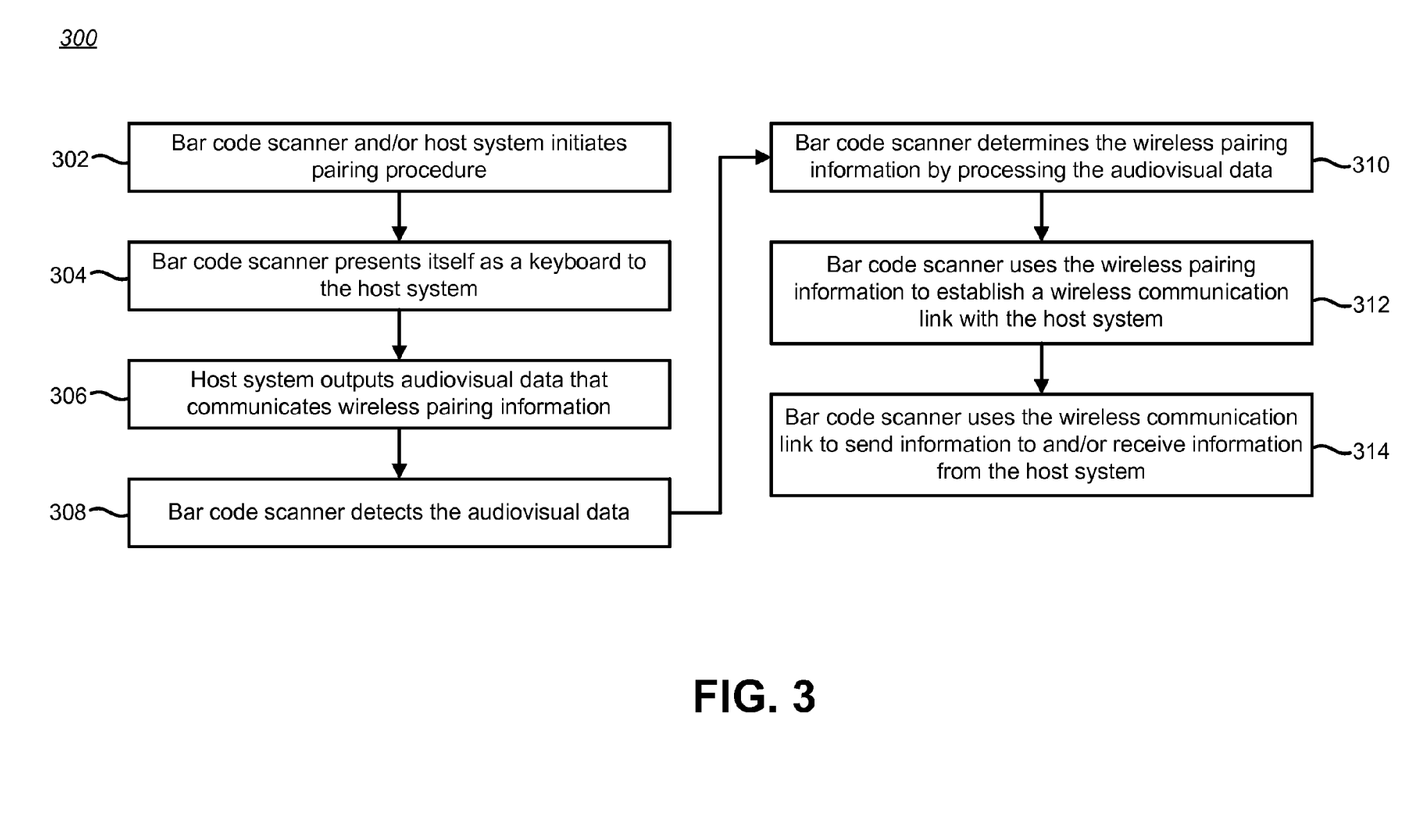
FIG. 3 illustrates a method for pairing a bar code scanner to a host system.

FIG. 3 illustrates a method 300 for pairing an electronic device, such as a bar code scanner 102, to a host system 104. In accordance with the method 300, a pairing procedure may be initiated 302 by the bar code scanner 102 and/or by the host system 104. The bar code scanner 102 may present 304 itself as a keyboard to the host system 104.

During the pairing procedure, the host system 104 may output 306 audiovisual data that communicates wireless pairing information 108. The host system 104 may output 306 the audiovisual data in such a way that the wireless pairing information 108 is discernible by humans. For example, the host system 104 may display an alphanumeric visual representation 110 of the wireless pairing information 108. As another example, the host system 204 may play an electronically generated dictation 210 of the wireless pairing information 208.

The bar code scanner 102 may detect 308 the audiovisual data that is output by the host system 104 and determine 310 the wireless pairing information 108 by processing the audiovisual data that it detects. For example, if the host system 104 displays an alphanumeric visual representation 110 of the wireless pairing information 108, a camera 114 of the bar code scanner 102 may capture a digital image 116 of the alphanumeric visual representation 110, and an OCR module 118 of the bar code scanner 102 may perform OCR on the digital image 116 to determine the wireless pairing information 108. As another example, if the host system 204 plays an electronically generated dictation 210 of the wireless pairing information 208, an audio recorder 214 of the bar code scanner 202 may capture an audio recording 216 of the electronically generated dictation 210, and a speech recognition module 218 of the bar code scanner 202 may perform speech recognition on the audio recording 216 to determine the wireless pairing information 208.

The bar code scanner 102 may use the wireless pairing information 108 to establish 312 a wireless communication link 120 with the host system 104. The bar code scanner 102 may send 314 information to and/or receive information from the host system 104 via the wireless communication link 120. For example, the bar code scanner 102 may transfer decoded data 122 to the host system 104 via the wireless communication link 120.

Figure 4:
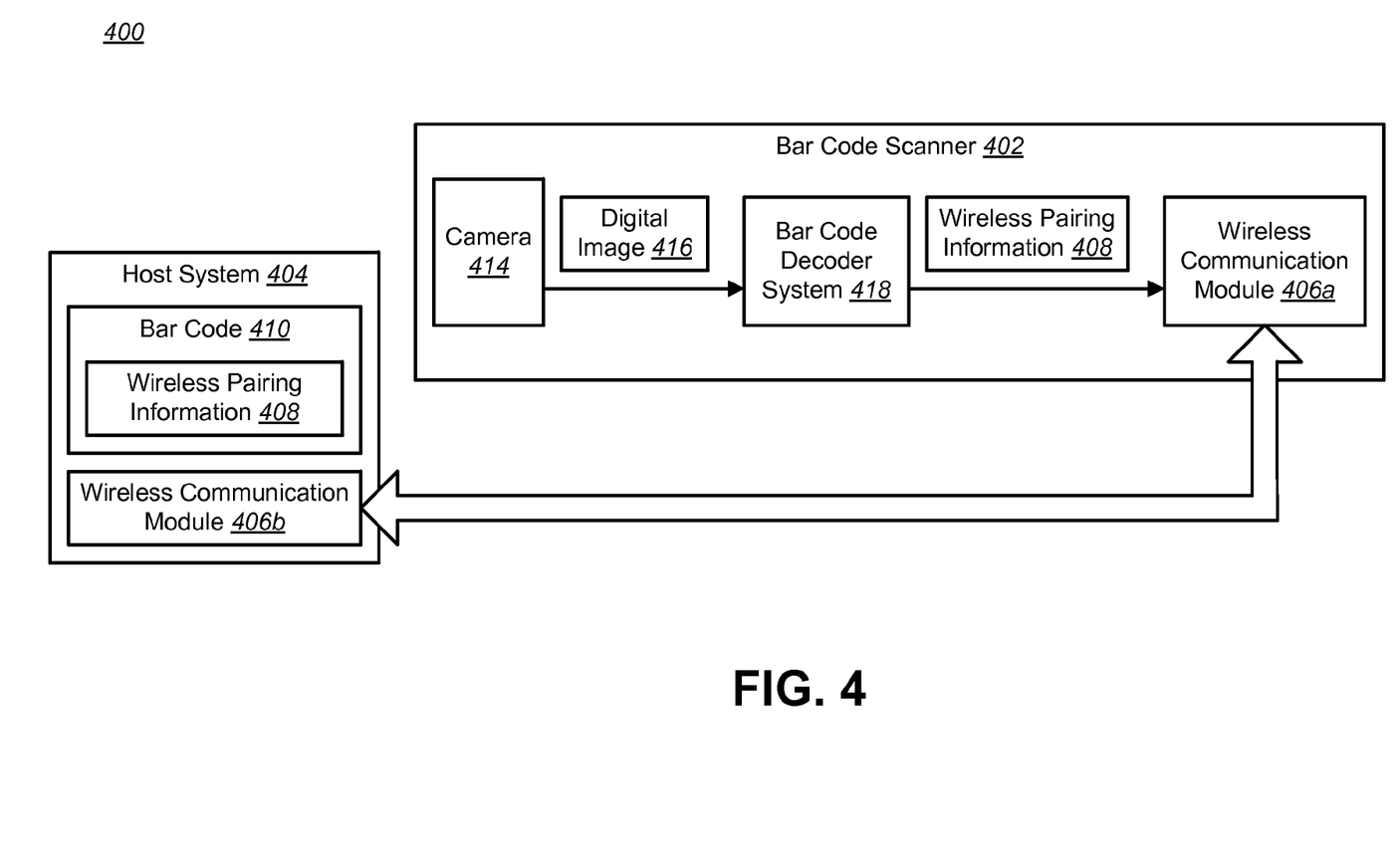
FIG. 4 illustrates another system in which a bar code scanner may be paired to a host system.

FIG. 4 illustrates another system 400 in which an electronic device, such as a bar code scanner 402, may be paired to a host system 404. The system 400 shown in FIG. 4 may be similar to the system 100 shown in FIG. 1, except as described below.

In the system 400 shown in FIG. 4, the bar code scanner 402 and the host system 404 may operate in accordance with Bluetooth® v2.1 (or later). As mentioned previously, Bluetooth® v2.1 allows the use of SSP for link key establishment. SSP provides several different association models, including numeric comparison and passkey entry.

In accordance with the numeric comparison association model, two Bluetooth® devices that are being paired with one another both display a confirmation value. (The confirmation value will be discussed in greater detail below in connection with FIG. 6.) A user may provide a "yes" response on both devices if the confirmation values match. Otherwise, the user may respond "no" and pairing fails. One significant difference between this approach and the use of PINs (as described previously) is that the displayed confirmation value is not used as input for link key generation. Instead, the confirmation value is used to confirm that the pairing procedure is being performed with the correct device, as opposed to being performed with an unauthorized device (e.g., a man-in-the-middle attack). Because the displayed confirmation value is not used for link key generation, an eavesdropper who is able to view (or otherwise capture) the displayed confirmation value could not use it to determine the resulting link key.

The passkey entry association model was designed for the situation where one Bluetooth® device has the capability to receive alphanumeric input, while the other device has a display but not input capability. With this model, the device with only a display shows a passkey that the user then enters on the device with input capability. (The passkey will be discussed in greater detail below in connection with FIG. 7.) As with the numeric comparison model, the passkey that is displayed in this transaction is used to confirm that the pairing procedure is being performed with the correct device, as opposed to being performed with an unauthorized device. The displayed passkey is not incorporated into link key generation and is of no use to an eavesdropper.

Like the host system 104 discussed previously, the host system 404 shown in FIG. 4 may output audiovisual data that communicates wireless pairing information 408. If pairing between the bar code scanner 402 and the host system 404 is proceeding in accordance with the numeric comparison association model, the wireless pairing information 408 may be a confirmation value. If pairing between the bar code scanner 402 and the host system 404 is proceeding in accordance with the passkey entry association model, the wireless pairing information 408 may be a passkey.

The wireless pairing information 408 may or may not be discernible by humans when it is output by the host system 404. For example, the host system 404 may display one or more bar code(s) 410 that includes an encoded representation of the wireless pairing information 408, in which case the wireless pairing information 408 would not be discernible by humans. The bar code(s) 410 may be a single 1D or 2D bar code representing a sequence of characters or numerals, a sequence of 1D or 2D bar codes, each representing a single character or numeral, or one or more 1D or 2D bar code(s) each representing multiple characters or numerals. If multiple bar codes are used for sequential reading to input the wireless pairing information 408, an additional bar code may represent completion of entry of the pairing information 408 (a finished code) indicative to the bar code scanner 402 that entry of the wireless pairing information 408 is complete.

Alternatively, the host system 404 may display an alphanumeric visual representation of the wireless pairing information 408, or play an electronically generated dictation of the wireless pairing information 408, as discussed previously. In these examples, the wireless pairing information 408 may be discernible by humans when it is output by the host system 404.

Like the bar code scanner 102 discussed previously, the bar code scanner 402 shown in FIG. 4 may include a data detector, which may be a camera 414. The bar code scanner 402 may also include a recognition module, which may be a bar code decoder system 418. The camera 414 may detect the audiovisual data that is output by the host system 404 by capturing a digital image 416 of the bar code(s) 410 that is/are displayed by the host system 404 to communicate the wireless pairing information 408. The bar code decoder system 418 may determine the wireless pairing information 408 by decoding the bar code(s) 410.

A wireless communication module 406a within the bar code scanner 402 may use the wireless pairing information 408 to confirm that the pairing procedure is being performed with the host system 404, as opposed to being performed with an unauthorized device. If the wireless communication module 406a determines that the pairing procedure is not being performed with the host system 404, the wireless communication module 406a may abort the pairing procedure and indicate to a user of the bar code scanner 402 that the pairing procedure has been aborted. For example, the wireless communication module 406a may activate a red indicator light. If the wireless communication module 406a confirms that the pairing procedure is being performed with the host system 404, the wireless communication module 406a may indicate to the user that the pairing procedure is proceeding. For example, the wireless communication module 406a may activate a green indicator light.

Figure 5:
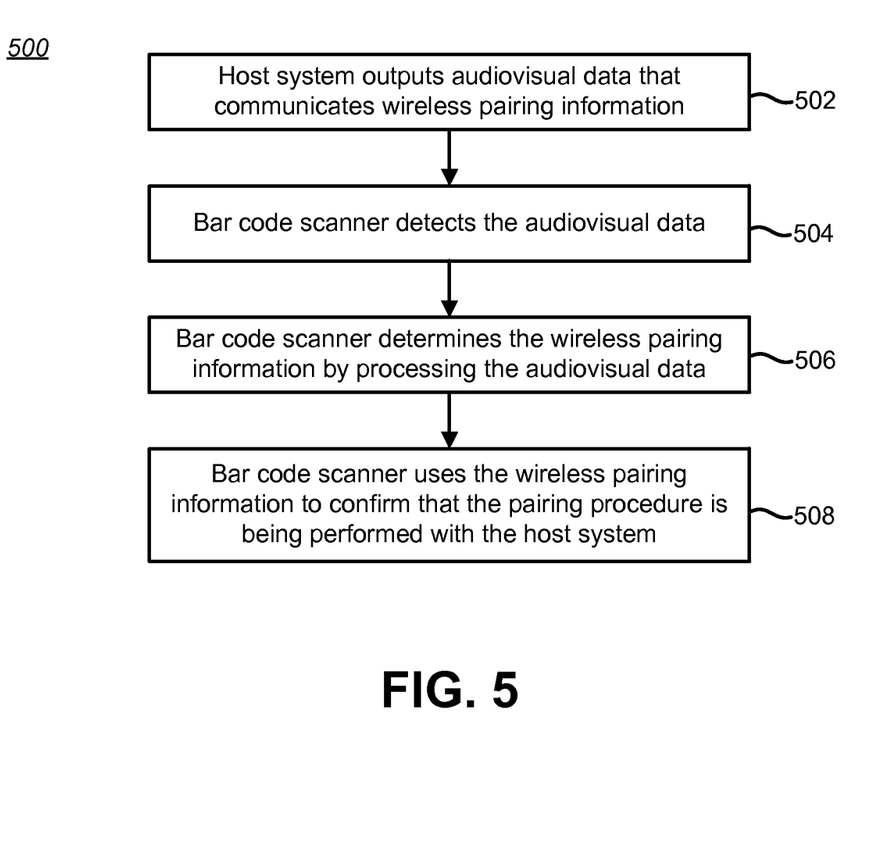
FIG. 5 illustrates another method for pairing a bar code scanner to a host system.

FIG. 5 illustrates another method 500 for pairing an electronic device, such as a bar code scanner 402, to a host system 404. During a pairing procedure involving the bar code scanner 402 and the host system 404, the host system 404 may output 502 audiovisual data that communicates wireless pairing information 408. The wireless pairing information 408 may or may not be discernible by humans when it is output by the host system 404.

The bar code scanner 402 may detect 504 the audiovisual data that is output by the host system 404 and determine 506 the wireless pairing information 408 by processing the audiovisual data that it detects. For example, if the host system 404 displays one or more bar code(s) 410 that includes an encoded representation of the wireless pairing information 408, a camera 414 of the bar code scanner 402 may capture a digital image 416 of the bar code(s) 410, and a bar code decoder system 418 of the bar code scanner 402 may determine the wireless pairing information 408 by decoding the bar code(s) 410. The bar code scanner 402 may use the wireless pairing information 408 to confirm 508 that the pairing procedure is being performed with the host system 404, as opposed to being performed with an unauthorized device.

Figure 6:
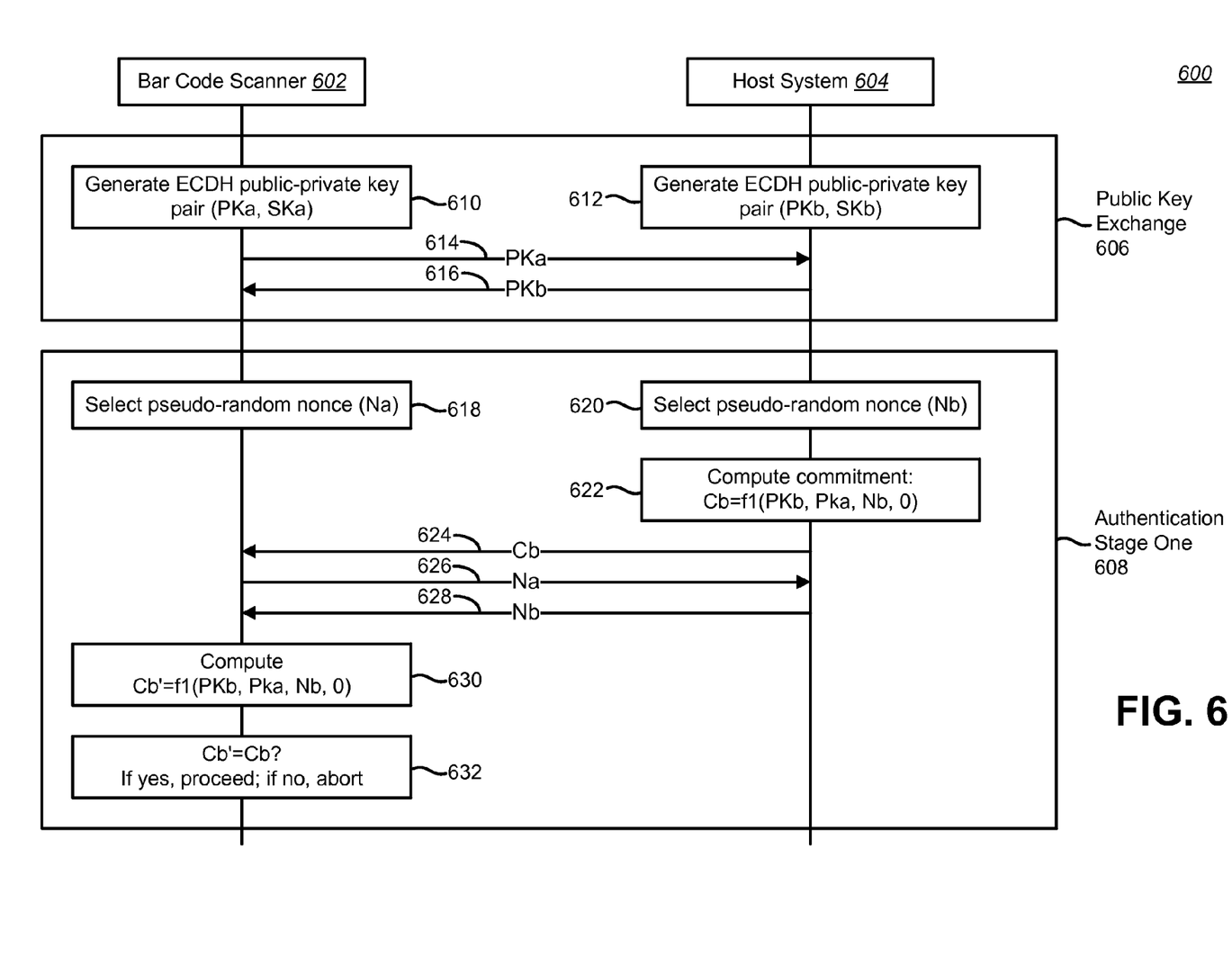
FIG. 6 illustrates another method for pairing a bar code scanner to a host system.

FIG. 6 illustrates another method 600 for pairing an electronic device, such as a bar code scanner 602, to a host system 604. In this method 600, pairing between the bar code scanner 602 and the host system 604 is being performed in accordance with Bluetooth® v2.1 (or later), and the numeric comparison association model is being used.

The Bluetooth® v2.1 (or later) specification defines five phases for SSP: public key exchange, authentication stage one, authentication stage two, link key calculation, and link manager protocol (LMP) authentication and encryption.

During public key exchange 606, the bar code scanner 602 may generate 610 an ECDH public-private key pair (PKa and SKa, respectively). The host system 604 may also generate 612 an ECDH public-private key pair (PKb and SKb, respectively). The bar code scanner 602 may send 614 its public key (PKa) to the host system 604. The host system 604 may send 616 its public key (PKb) to the bar code scanner 602.

During authentication stage one 608, the bar code scanner 602 and the host system 604 may both select 618, 620 a pseudo-random nonce (Na and Nb, respectively). The host system 604 may compute 622 a commitment value (Cb), which may depend on PKb, PKa, and Nb. The host system 604 may send 624 the commitment value (Cb) to the bar code scanner 602. The bar code scanner 602 may send 626 its pseudo-random nonce (Na) to the host system 604. The host system 604 may send 628 its pseudo-random nonce (Nb) to the bar code scanner 602.

The bar code scanner 602 may compute 630 a confirmation commitment value (Cb'), using the same function that the host system 604 used to compute 622 the commitment value (Cb). The bar code scanner 602 may determine 632 whether the confirmation commitment value (Cb') equals the commitment value (Cb) received from the host system 604. If it does, the pairing procedure may proceed. If not, the pairing procedure may be aborted.

The bar code scanner 602 may calculate 634 a first confirmation value (Va). The host system 604 may calculate 636 a second confirmation value (Vb). Both the first confirmation value (Va) and the second confirmation value (Vb) may depend on PKa, PKb, Na and Nb.

The host system 604 may generate 638 and output 640 audiovisual data that communicates the second confirmation value (Vb). The bar code scanner 602 may detect 642 the audiovisual data. The audiovisual data may be output 640 by the host system 604 and detected 642 by the bar code scanner 602 using any of the approaches discussed previously. The bar code scanner 602 may determine 644 the second confirmation value (Vb) from the audiovisual data.

The bar code scanner 602 may determine 646 whether the first confirmation value (Va) equals the second confirmation value (Vb). If the first confirmation value (Va) equals the second confirmation value (Vb), the bar code scanner 602 may proceed 648 with the pairing procedure. However, if the first confirmation value (Va) does not equal the second confirmation value (Vb), the bar code scanner 602 may abort 648 the pairing procedure. The bar code scanner 602 may indicate 650 to the user whether pairing is proceeding or being aborted. If pairing is proceeding, then the remaining phases of SSP (authentication stage two, link key calculation, and LMP authentication and encryption) may be performed as described in the Bluetooth® v2.1 (or later) specification.

Figure 7:
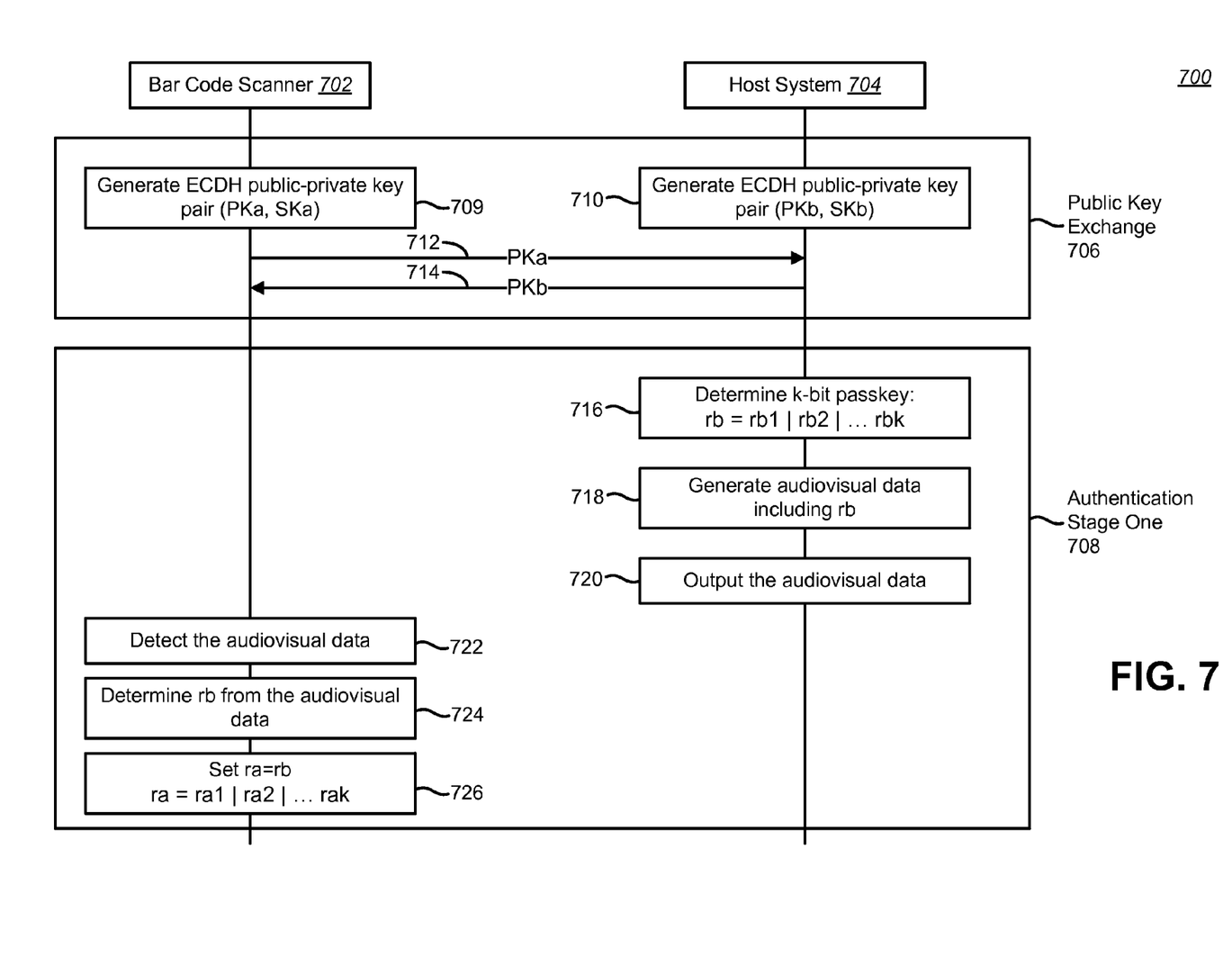
FIG. 7 illustrates another method for pairing a bar code scanner to a host system.

FIG. 7 illustrates another method 700 for pairing an electronic device, such as a bar code scanner 702, to a host system 704. In this method 700, pairing between the bar code scanner 702 and the host system 704 is being performed in accordance with Bluetooth® v2.1 (or later), and the passkey entry association model is being used.

During public key exchange 706, the bar code scanner 702 may generate 709 an ECDH public-private key pair (PKa and SKa, respectively). The host system 704 may also generate 710 an ECDH public-private key pair (PKb and SKb, respectively). The bar code scanner 702 may send 712 its public key (PKa) to the host system 704. The host system 704 may send 714 its public key (PKb) to the bar code scanner 702.

During authentication stage one 708, the host system 704 may determine 716 a k-bit passkey (rb). The host system 704 may generate 718 and output 720 audiovisual data that communicates the passkey (rb). The bar code scanner 702 may detect 722 the audiovisual data. The audiovisual data may be output 720 by the host system 704 and detected 722 by the bar code scanner 702 using any of the approaches discussed previously. The bar code scanner 702 may determine 724 the passkey (rb) from the audiovisual data, and may set 726 a passkey variable (ra) equal to the passkey (rb) received from the host system 704.

The bar code scanner 702 and the host system 704 may then perform a multi-stage process 728. Via the multi-stage process 728, the bar code scanner 702 may calculate a first commitment value (Ca), and the host system 704 may calculate a second commitment value (Cb). The bar code scanner 702 may send the first commitment value (Ca) to the host system 704 one segment (e.g., one bit) at a time. Conversely, the host system 704 may send the second commitment value (Cb) to the bar code scanner 702 one segment at a time. Both the bar code scanner 702 and the host system 704 may compare the first commitment value (Ca) with the second commitment value (Cb) one segment at a time. If the host system 704 displays the audiovisual data that communicates the passkey (rb), the host system 704 may discontinue displaying the audiovisual data when comparison of the first commitment value (Ca) with the second commitment value (Cb) begins. The bar code scanner 702 and/or the host system 704 may abort the pairing procedure if any segment of the first commitment value (Ca) does not match a corresponding segment of the second commitment value (Cb) received from the host system 704.

The first commitment value (Ca) calculated by the bar code scanner 702 may depend on the public key (PKa) for the bar code scanner 702, the public key (PKb) for the host system 704, a random nonce (Na), and the passkey (rb). Although FIG. 7 shows the first commitment value (Ca) being calculated using the passkey variable (ra), the passkey variable (ra) may be set equal to the passkey (rb), as indicated previously. Therefore, the first commitment value (Ca) may also depend on the passkey (rb). The second commitment value (Cb) calculated by the host system 704 may depend on the public key (PKa) for the bar code scanner 702, the public key (PKb) for the host system 704, a random nonce (Nb), and the passkey (rb).

The multi-stage process 728 is illustrated in FIG. 7 as a series of operations that are executed k times. FIG. 7 illustrates these operations in relation to the $i^{th}$ stage of the multi-stage process 728, where i=1, 2, . . . k, and where the passkey (rb) includes k bits.

During the $i^{th}$ stage of the multi-stage process 728, the bar code scanner 702 may select 730 a first random nonce (Nai), and the host system 704 may select 732 a second random nonce (Nbi). The bar code scanner 702 may calculate 734 bit i of the first commitment value (Ca). The host system 704 may calculate 736 bit i of the second commitment value (Cb). The bar code scanner 702 may send 738 bit i of the first commitment value (Cai) to the host system 704.

If the host system 704 displays the audiovisual data that communicates the passkey (rb), then in response to receiving the first bit of the first commitment value (Ca) during the first stage of the multi-stage process 728 (i.e., for i=1), the host system 704 may erase 740 the audiovisual data from the display. The host system 704 may send 742 bit i of the second commitment value (Cbi) to the bar code scanner 702. The bar code scanner 702 may send 744 bit i of the first random nonce (Nai) to the host system 704. The host system 704 may check 746 whether bit i of the first commitment value (Cai) received from the bar code scanner 702 equals bit i of the second commitment value (Cbi), which it previously calculated 736. If it does, then the pairing procedure may proceed. If not, the host system 704 may abort the pairing procedure.

The host system 704 may send 748 bit i of the second random nonce (Nbi) to the bar code scanner 702. The bar code scanner 702 may check 750 whether bit i of the second commitment value (Cbi) received from the host system 704 equals bit i of the first commitment value (Cai), which it previously calculated 734. If the two bits match, then the multi-stage process 728 may proceed. If not, the bar code scanner 702 may abort the pairing procedure. If pairing has not been aborted after the multi-stage process 728 has concluded, then the remaining phases of SSP (authentication stage two, link key calculation, and LMP authentication and encryption) may be performed as described in the Bluetooth® v2.1 (or later) specification.

Figure 8:
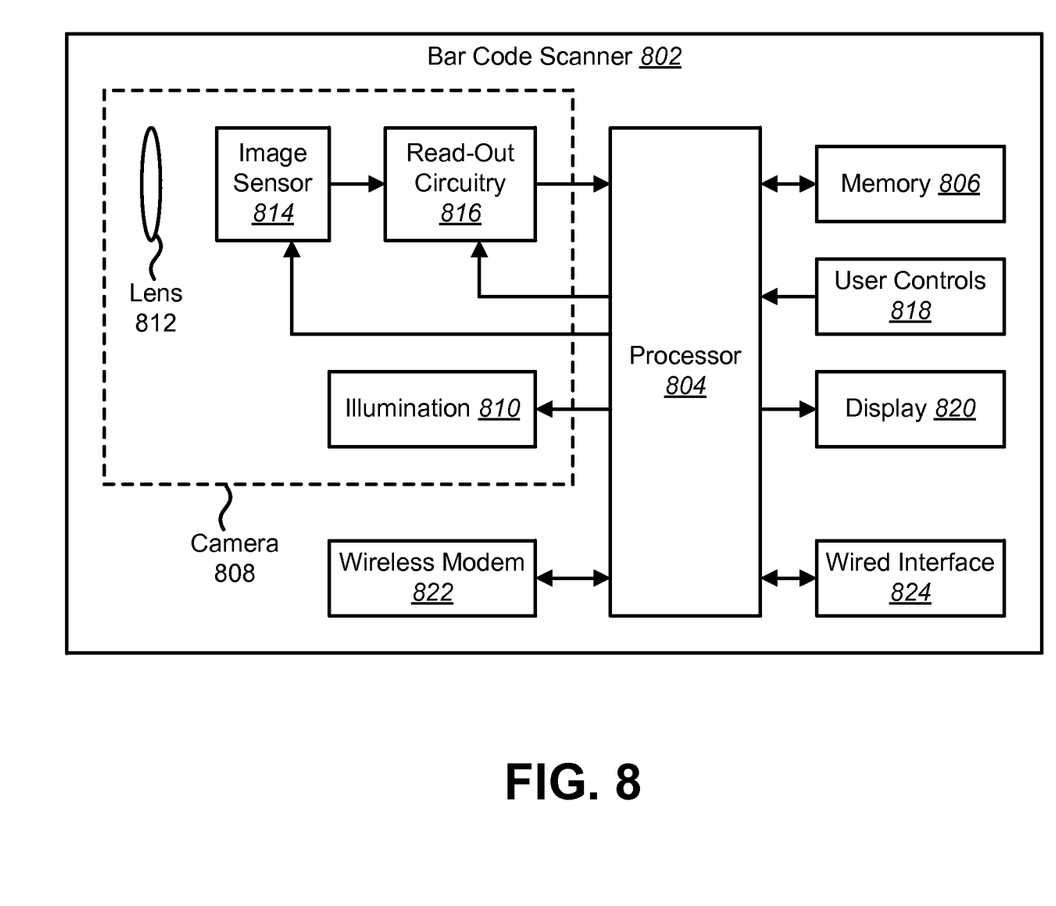
FIG. 8 illustrates various components that may be utilized in a bar code scanner.

FIG. 8 illustrates various components that may be utilized in a bar code scanner 802. Any of the bar code scanners 102, 202, 402, 602, 702 described previously may include some or all of the components of the bar code scanner 802.

The bar code scanner 802 includes a processor 804. The processor 804 may be a general purpose single- or multi-chip microprocessor (e.g., an ARM), a special purpose microprocessor (e.g., a digital signal processor (DSP)), a microcontroller, a programmable gate array, etc. The processor 804 may be referred to as a central processing unit (CPU).

Although just a single processor 804 is shown in the bar code scanner 802 of FIG. 8, in an alternative configuration, a combination of processors (e.g., an ARM and DSP) could be used.

The bar code scanner 802 also includes memory 806 in electronic communication with the processor 804. That is, the processor 804 can read information from and/or write information to the memory 806. The memory 806 may be any electronic component capable of storing electronic information. The memory 806 may be random access memory (RAM), read-only memory (ROM), magnetic disk storage media, optical storage media, flash memory devices in RAM, on-board memory included with the processor 804, programmable read-only memory (PROM), erasable programmable read-only memory (EPROM), electrically erasable PROM (EEPROM), registers, and so forth, including combinations thereof.

Data and instructions may be stored in the memory 806. The instructions may include one or more programs, routines, sub-routines, functions, procedures, etc. The instructions may include a single computer-readable statement or many computer-readable statements. The instructions may be executable by the processor 804 to implement one or more of the methods, functions and procedures described above. Executing the instructions may involve the use of the data that is stored in the memory 806.

The bar code scanner 802 may include several components that may collectively be referred to as a camera 808. Illumination components 810 within the camera 808 may be activated so as to illuminate a target area. The illumination components 810 may include light-emitting diodes (LEDs) and appropriate control circuitry. One or more lenses 812 within the camera 808 may focus light reflected from item(s) within the target area (e.g., a bar code) onto an image sensor 814. The image sensor 814 may be a solid-state photo-detecting device containing a relatively large number of light-sensitive pixels that are arranged in horizontal rows and vertical columns. Read-out circuitry 816 may electronically read the pixels within the image sensor 814 in order to obtain a digital image.

The bar code scanner 802 may include one or more user controls 818 that may be used to provide user input. Examples of different kinds of user controls 818 include one or more buttons, a touchscreen, a keyboard (actual and/or virtual), a microphone, a trackball, a lightpen, etc.

The bar code scanner 802 may include a display 820. The display 820 may utilize any suitable image projection technology, such as a liquid crystal display (LCD), light-emitting diode (LED), gas plasma, electroluminescence, etc. The display 820 may be a touchscreen. A display controller may also be provided, for converting data stored in the memory 806 into text, graphics, and/or moving images (as appropriate) shown on the display 820.

The bar code scanner 802 may include one or more communication interfaces for communicating with other electronic devices. For example, the bar code scanner 802 may include a wireless modem 822 that allows the bar code scanner 802 to be connected to a wireless network. Alternatively, or in addition, the bar code scanner 802 may include a wired communication interface 824 (e.g., a USB interface).

Any of the host systems 104, 204, 404, 604, 704 described previously may include at least some of the components shown in FIG. 8, such as the processor 804, memory 806, user controls 818, display 820, etc.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

One or more of the features, functions, procedures, components, elements, structures, etc., described in connection with any one of the configurations described herein may be combined with one or more of the functions, procedures, components, elements, structures, etc., described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A device for pairing to a host system, the device comprising:
   a wireless communication module that implements a short-range wireless communication protocol;
   a data detector that comprises a camera, wherein the data detector detects audiovisual data that is output by the host system during a pairing procedure that is performed in accordance with the short-range wireless communication protocol, wherein the audiovisual data communicates wireless pairing information, wherein the wireless pairing information is discernible by humans when the audiovisual data is output by the host system, wherein the audiovisual data comprises an alphanumeric visual representation of the wireless pairing information, and wherein detecting the audiovisual data comprises capturing a digital image of the alphanumeric visual representation of the wireless pairing information; and
   a recognition module that determines the wireless pairing information by processing the audiovisual data.

2. The device of claim 1, wherein:
   the recognition module comprises an optical character recognition (OCR) module; and
   determining the wireless pairing information comprises performing OCR on the digital image.

3. The device of claim 2, wherein:
   the device further comprises a bar code scanner and a bar code decoder system; and
   the bar code decoder system transfers data decoded from a bar code to the host system via the wireless communication module.

4. The device of claim 1, wherein:
   the data detector comprises an audio recorder;
   the audiovisual data comprises an electronically generated dictation of the wireless pairing information; and
   detecting the audiovisual data comprises capturing an audio recording of the electronically generated dictation of the wireless pairing information.

5. The device of claim 4, wherein:
   the recognition module comprises a speech recognition module; and
   the speech recognition module performs speech recognition on the audio recording to determine the wireless pairing information.

6. The device of claim 5, wherein:
   the device further comprises a bar code scanner and a bar code decoder system; and
   the bar code decoder system transfers data decoded from a bar code to the host system via the wireless communication module.

7. A device for pairing to a host system, the device comprising:
   a wireless communication module that implements a short-range wireless communication protocol;
   a data detector that detects audiovisual data that is output by the host system during a pairing procedure that is performed in accordance with the short-range wireless communication protocol, wherein the audiovisual data communicates wireless pairing information; and
   a recognition module that determines the wireless pairing information by processing the audiovisual data;
   wherein the wireless communication module uses the wireless pairing information to confirm that the pairing procedure is being performed with the host system, and wherein the wireless communication module is also configured to abort the pairing procedure in response to determining that the pairing procedure is not being performed with the host system, and indicate to a user that the pairing procedure has been aborted.

8. The device of claim 7, wherein the wireless communication module is also configured to:
   confirm that the pairing procedure is being performed with the host system; and
   indicate to a user that the pairing procedure is proceeding.

9. The device of claim 7, wherein:
   the data detector comprises a camera;
   detecting the audiovisual data comprises capturing a digital image of a bar code;
   the recognition module comprises a bar code decoder system; and
   determining the wireless pairing information comprises decoding the bar code.

10. The device of claim 9, wherein the bar code decoder system transfers data decoded from another bar code to the host system via the wireless communication module.

11. The device of claim 7, wherein:
    the data detector comprises a camera;
    detecting the audiovisual data comprises capturing a digital image of an alphanumeric visual representation of the wireless pairing information;
    the recognition module comprises an optical character recognition module; and
    determining the wireless pairing information comprises performing optical character recognition on the digital image.

12. The device of claim 11, wherein:
    the device further comprises a bar code scanner and a bar code decoder system; and
    the bar code decoder system transfers data decoded from a bar code to the host system via the wireless communication module.

13. The device of claim 7, wherein:
    the data detector comprises an audio recorder;
    detecting the audiovisual data comprises capturing an audio recording of an electronically generated dictation of the wireless pairing information;

the recognition module comprises a speech recognition module; and determining the wireless pairing information comprises performing speech recognition on the audio recording.

14. The device of claim 13, wherein:

the device further comprises a bar code scanner and a bar code decoder system; and the bar code decoder system transfers data decoded from a bar code to the host system via the wireless communication module.

15. The device of claim 7, wherein the wireless pairing information comprises a second confirmation value, and wherein the device is configured to:

calculate a first confirmation value that depends on a public key for the device and a public key for the host system;

compare the first confirmation value with the second confirmation value; and abort the pairing procedure if the first confirmation value does not match the second confirmation value.

16. The device of claim 15, wherein the wireless communication module is also configured to indicate to a user that the pairing procedure has been aborted.

17. The device of claim 7, wherein the wireless pairing information comprises a passkey, and wherein the device is configured to:

calculate a first commitment value via a multi-stage process, wherein the first commitment value depends on the passkey, a public key for the device and a public key for the host system;

receive a second commitment value from the host system via the multi-stage process;

compare the first commitment value with the second commitment value via the multi-stage process; and abort the pairing procedure if any segment of the first commitment value does not match a corresponding segment of the second commitment value.

18. The device of claim 17, wherein the wireless communication module is also configured to indicate to a user that the pairing procedure has been aborted.

19. A host system for pairing to a device, the host system comprising a wireless communication module that implements a short-range wireless communication protocol, the host system being configured to:

generate audiovisual data that communicates a passkey for use in a pairing procedure between the host system and the device;

display the audiovisual data during the pairing procedure;

calculate a second commitment value that depends on the passkey, a public key of the device and a public key of the host system;

compare, via a multi-stage process, a first commitment value received from the device with the second commitment value; and discontinue displaying the audiovisual data when comparison of the first commitment value with the second commitment value begins.

20. The host system of claim 19, wherein the audiovisual data comprises a bar code.

21. The host system of claim 19, wherein the audiovisual data comprises an alphanumeric visual representation of the passkey.

* * * * *